(12) United States Patent
Morioka et al.

(10) Patent No.: US 11,520,173 B2
(45) Date of Patent: Dec. 6, 2022

(54) TRANSMISSION TYPE ADAPTIVE OPTICAL SYSTEM

(71) Applicant: MITSUBISHI HEAVY INDUSTRIES, LTD., Tokyo (JP)

(72) Inventors: Tomoya Morioka, Tokyo (JP); Koichi Hamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 365 days.

(21) Appl. No.: 16/639,205

(22) PCT Filed: Feb. 1, 2019

(86) PCT No.: PCT/JP2019/003607
§ 371 (c)(1),
(2) Date: Feb. 14, 2020

(87) PCT Pub. No.: WO2019/163481
PCT Pub. Date: Aug. 29, 2019

(65) Prior Publication Data
US 2020/0241333 A1    Jul. 30, 2020

(30) Foreign Application Priority Data

Feb. 26, 2018 (JP) ............................. JP2018-032277

(51) Int. Cl.
*G02F 1/01* (2006.01)
*G02B 27/00* (2006.01)
*H01S 3/106* (2006.01)

(52) U.S. Cl.
CPC ....... *G02F 1/0147* (2013.01); *G02B 27/0037* (2013.01); *H01S 3/106* (2013.01); *G02F 2203/18* (2013.01)

(58) Field of Classification Search
CPC ............... G02F 1/0147; G02F 2203/18; G02B 27/0037; H01S 3/106
See application file for complete search history.

(56) References Cited

U.S. PATENT DOCUMENTS 6,028,977 A    2/2000   Newsome
2004/0061149 A1    4/2004   Jyumonji et al.
(Continued)

FOREIGN PATENT DOCUMENTS

DE   102015116752 A1 *   4/2016   ............. G02B 26/06
JP    03149524 A  *  11/1989
(Continued)

OTHER PUBLICATIONS

Furuse et al., "Thermo-optic properties of ceramic YAG at high temperatures," Opt. Mater. Express 4, 1794-1799 (2014) (Year: 2014).*

(Continued)

*Primary Examiner* — Peter Radkowski
(74) *Attorney, Agent, or Firm* — Wenderoth, Lind & Ponack, L.L.P.

(57) ABSTRACT

A transmission type adaptive optical system that can be applied to a high power laser beam beyond a limit of deformable mirrors and corrects wavefront turbulence of a laser beam with adaptation to the wavefront turbulence is provided. By using a transmission type adaptive optical element of which a refractive index distribution changes based on temperature distribution thereof, a wavefront turbulence of a laser beam is corrected with adaptation to this wavefront turbulence. The wavefront turbulence is detected by a wavefront sensor and heating light in accordance with the detected wavefront turbulence is emitted to irradiate the transmission type adaptive optical element. The transmission type adaptive optical element transmits a laser beam as a target to correct a wavefront turbulence thereof and (Continued)

generates temperature distribution by the heating light and as a result generates the refractive index distribution.

6 Claims, 7 Drawing Sheets

(56) References Cited

U.S. PATENT DOCUMENTS

| | | | | |
|---|---|---|---|---|
| 2006/0256419 | A1* | 11/2006 | Graf | G02F 1/0147 359/237 |
| 2010/0059490 | A1* | 3/2010 | Unrath | B23K 26/0613 219/121.73 |
| 2010/0201958 | A1* | 8/2010 | Hauf | G02B 7/008 355/30 |
| 2010/0232007 | A1* | 9/2010 | Byren | F41H 13/005 359/239 |
| 2012/0250134 | A1 | 10/2012 | Unrath et al. | |
| 2016/0104996 | A1* | 4/2016 | Klennert | H01S 3/0085 359/239 |

FOREIGN PATENT DOCUMENTS

| | | | |
|---|---|---|---|
| JP | 03-149524 | | 6/1991 |
| JP | 2007524106 | A * | 2/2004 |
| JP | 2004-336013 | | 11/2004 |
| JP | 2004336013 | A * | 11/2004 ............ B23K 26/04 |
| JP | 2007-524106 | | 8/2007 |
| JP | 2012-501853 | | 1/2012 |
| JP | 2012501853 | A * | 1/2012 |
| JP | 2012-141515 | | 7/2012 |
| JP | 2012141515 | A * | 7/2012 |

OTHER PUBLICATIONS

Suhara et al., "Graded-index Fresnel lenses for integrated optics," Appl. Opt. 21, 1966-1971 (1982) (Year: 1982).*
Marcano et al., "Optimizing and calibrating a mode-mismatched thermal lens experiment for low absorption measurement," J. Opt. Soc. Am. B 23, 1408-1413 (2006) (Year: 2006).*
Dobek, Krzysztof, , "Motionless microscopy with tunable thermal lens," Opt. Express 26, 3892-3902 (2018) (Year: 2018).*
Arain et al., "Adaptive beam shaping by controlled thermal lensing in optical elements," Appl. Opt. 46, 2153-2165 (2007) (Year: 2007).*
Liu et al., "Feedback control of optical beam spatial profiles using thermal lensing," Appl. Opt. 52, 6452-6457 (2013) (Year: 2013).*
Brooks et al., "Overview of Advanced LIGO adaptive optics," Appl. Opt. 55, 8256-8265 (2016) (Year: 2016).*
Beedell, James, Nd:YAG Based Laser Sources for Targeting Applications, Engineering Doctorate in Photonics at Heriot-Watt University, 2013 (Year: 2013).*
Li et al., Fresnel diffraction model for mode-mismatched thermal lens with top-hat beam excitation, Appl. Phys. B 80, 527-534 (2005) (Year: 2005).*
Mansell et al., Evaluating the effect of transmissive optic thermal lensing on laser beam quality with a Shack-Hartmann wave-front sensor, Applied Optics, V. 40, N. 3, 2001 (Year: 2001).*
English Translation of the International Preliminary Report on Patentability dated Sep. 3, 2020 in International Application No. PCT/JP2019/003607.
Extended European Search Report dated Oct. 13, 2020 in counterpart European Patent Application No. 19757140.9.
Wyss et al., "Thermooptical Compensation Methods for High-Power Lasers", IEEE Journal of Quantum Electronics, Dec. 2002, vol. 38, No. 12, pp. 1620-1628.
International Search Report dated Mar. 5, 2019 in International (PCT) Application No. PCT/JP2019/003607.

* cited by examiner

TRANSMISSION TYPE ADAPTIVE OPTICAL SYSTEM

TECHNICAL FIELD

The present invention relates to a transmission type adaptive optical system and is suitable for use in a transmission type adaptive optical system that corrects a wavefront of a laser beam for example.

BACKGROUND ART

A wavefront of a laser beam may be disturbed. A wavefront can be defined as a set of points of which optical path length of light emitted from a same light source is same. In case of a laser beam, phase is aligned in a same wavefront. In order to maximize an intensity obtained when focusing a laser beam on an arbitrary point, a phase needs to be aligned at this focusing point. In addition, if a wavefront of a laser beam is disturbed, the laser beam may focus on an undesired point. When an undesired focusing occurs on an optical element through which the laser beam is supposed to pass, this optical element may be damaged. From such a viewpoint or the like, there is a demand to correct wavefront turbulence of laser beam. It should be noted that wavefront turbulence is also called wavefront distortion.

Wavefront turbulence of laser beam may be caused by, for example, heat occurred in laser medium that generates the laser beam, disturbance in refractive index distribution in an atmosphere where the laser beam propagates, or the like.

A technology of correcting a wavefront turbulence of a laser beam by a deformable mirror is known. However, deformable mirrors are difficult to cool due to their structure and cannot handle a high power laser beam beyond a certain level.

In relation with the above, patent literature 1 (Japanese patent publication 2012-141515 A) discloses a fluid optical element. This fluid optical element contains a liquid having a wavelength selectivity of absorbing laser beam with a first wavelength and transmitting a laser beam with a second wavelength. This liquid is a medium having a temperature dependence related to refractive index. This fluid optical element is given with a temperature gradient by irradiation of laser light with a first wavelength to the liquid and shows a lens effect by a refractive index gradient of the liquid with the temperature gradient. This fluid optical element gives a lens effect to an incident laser beam with the second wavelength.

In the patent literature 1, heat distribution is modified by making the fluid optical element to absorb light with a specific wavelength. As a result, refractive index distribution related to light with other wavelength is modified and control of wavefront of this light is carried out by lens effect or the like. However, since the fluid optical element in the patent literature 1 consists of a liquid, there is a severe limitation in a range of temperature that can be used to control heat distribution. In addition, as convection occurs in a liquid with uneven heat distribution, accuracy in a level of realizing correction of fine wavefront distortion is considered to be difficult to achieve.

CITATION LIST

Patent Literature

[Patent literature 1] Japanese patent publication 2012-141515 A

SUMMARY OF INVENTION

An object of the present invention is to provide a transmission type adaptive optical system that can be applied to a high power laser beam beyond a limit of deformable mirrors and corrects wavefront turbulence of a laser beam with adaptation to the wavefront turbulence. Other objects and new features will be understood from description of the present description and attached drawings.

A transmission type adaptive optical system according to an embodiment is provided with a laser emission device, a partial reflection mirror, a wavefront sensor, a control device, a heating light source, a transmission type adaptive optical element and an irradiation optical system. Herein, the laser emission device emits a laser beam. The partial reflection mirror reflects a part of the laser beam as reflected light and transmits another part as transmission light. The wavefront sensor detects wavefront distortion of the reflected light, generates wavefront distortion signal indicating the wavefront distortion and outputs it. The control device generates control signal to correct the wavefront distortion based on the wavefront distortion signal and outputs it. The heating light source generates heating light that adjusts temperature distribution in an irradiated optical element based on the control signal and emits it. The transmission type adaptive optical element is arranged on a light path between the laser emission device and the partial reflection mirror to transmit the laser beam and configured to correct the wavefront of the laser beam by a refraction index distribution adjusted by a temperature distribution occurred by irradiation of the heating light. The irradiation optical system irradiates a desired target with transmission light that is transmitted through the partial reflection mirror.

According to the above described embodiment, by using a transmission type adaptive optical element of which refractive index distribution changes based on temperature distribution thereof, a wavefront turbulence of a high power laser beam can be corrected with adaptation to this wavefront turbulence.

DESCRIPTION OF EMBODIMENT

An embodiment of a transmission type adaptive optical system according to the present invention will be described below with reference to attached drawings.

Related Art

Figure 1:
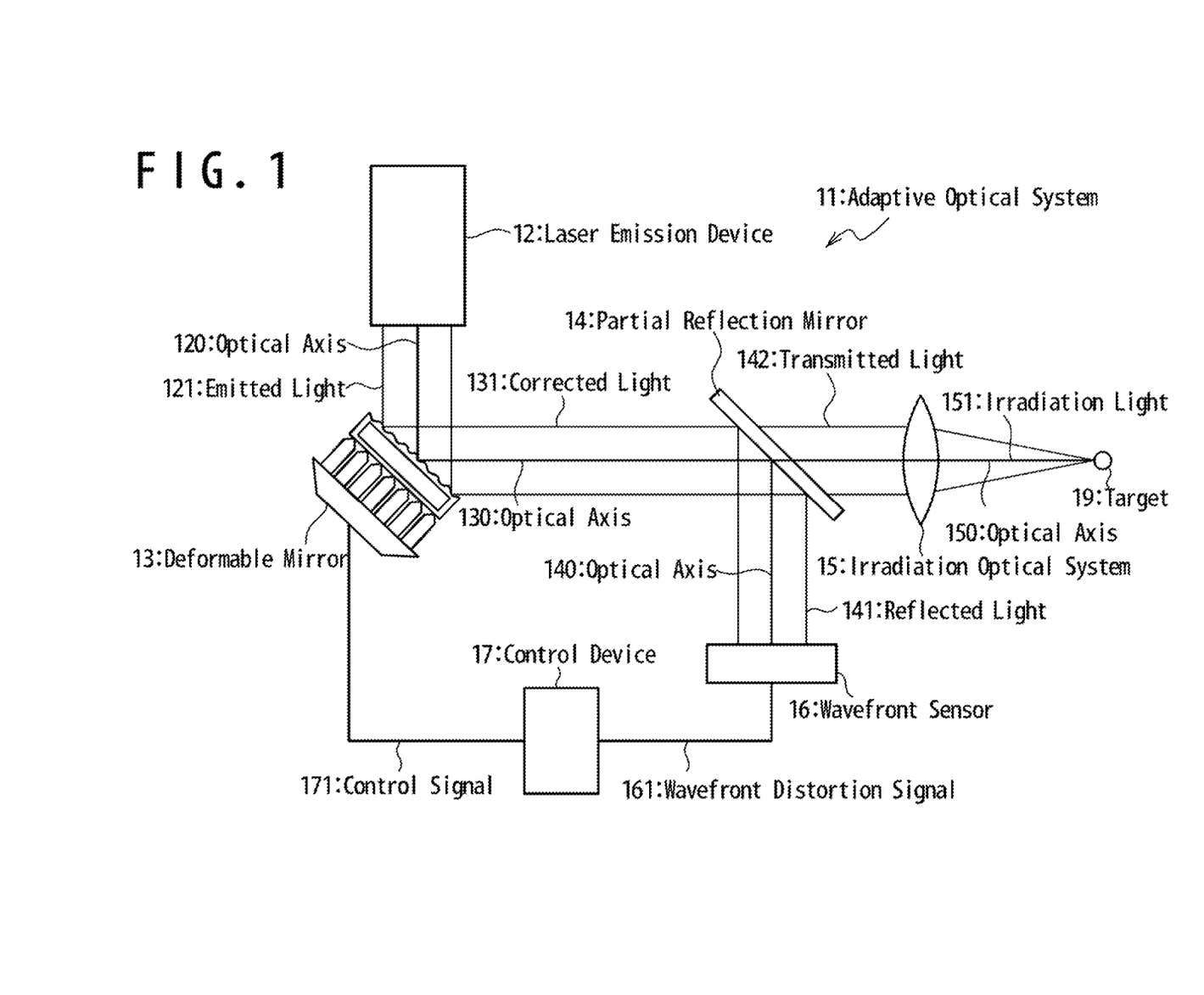
FIG. 1 is a diagram showing a configuration example of an adaptive optical system related to a related art.

For a better understanding of the transmission type adaptive optical system according to the present invention, an adaptive optical system 11 according to a related art will be described at first with reference to FIG. 1. FIG. 1 is a diagram showing a configuration example of an adaptive optical system 11 according to a related art.

Components of the adaptive optical system 11 in FIG. 1 will be described. The adaptive optical system 11 in FIG. 1 is provided with a laser emission device 12, a deformable mirror 13, a partial reflection mirror 14, an irradiation optical system 15, a wavefront sensor 16 and a control device 17.

Connection relationship and arrangement relationship of the components of the adaptive optical system 11 in FIG. 1 will be described. A laser beam emitted by the laser emission device 12 will be referred to as emitted light 121 for convenience. The emitted light 121 travels along its optical axis 120 and is reflected by the deformable mirror 13 arranged in downstream side of the laser emission device 12. The emitted light 121 after being reflected by the deformable mirror will be referred to as corrected light 131 for convenience.

A part of the corrected light 131 travels along its optical axis 130 and is reflected by the partial reflection mirror 14 arranged in downstream side of the deformable mirror 13. It should be noted that although in the configuration example in FIG. 1 the optical axis 120 and the optical axis 130 are perpendicularly intersecting, this angle may be modified by appropriately adjusting arrangement of the deformable mirror 13. A part of the corrected light 131 that is reflected by the partial reflection mirror 14 will be referred to as reflected light 141 for convenience. The reflected light 141 reaches the wavefront sensor 16. It should be noted that an optical axis 140 of the reflected light 141 is not parallel to the optical axis 130.

Another part of the corrected light 131 transmits through the partial reflection mirror 14. A part of the corrected light 131 that transmitted through the partial reflection mirror 14 will be referred to as transmitted light 142 for convenience. The transmitted light 142 travels along the optical axis 130 and transmits through the irradiation optical system 15 arranged in downstream side of the partial reflection mirror 14. The transmitted light 142 after transmitting through the irradiation optical system 15 will be referred to as irradiation light 151 for convenience.

It should be noted that in the configuration example in FIG. 1 an optical axis 150 of the irradiation light 151 is parallel to the optical axis 130 and the irradiation light 151 focuses at a position of a desired target 19. However, this is merely an example. Specifically, the position of the target 19 is not on the optical axis 130 necessarily. On the contrary, the irradiation optical system 15 may appropriately adjust a direction of the optical axis 150 of the irradiation light 151 and the focusing position of the irradiation light 151 based on the position of the target 19.

The wavefront sensor 16 is electrically connected to the control device 17. More specifically, a wavefront distortion signal 161 generated and outputted by the wavefront sensor 16 is transmitted to the control device 17 and is received by the control device 17. The control device 17 is electrically connected to the deformable mirror 13. More specifically, a control signal 171 generated and outputted by the control device 17 is transmitted to the deformable mirror 13 and is received by the deformable mirror 13.

Operations of components of the adaptive optical system 11 in FIG. 1 will be described. At first, the deformable mirror 13 returns to an initial state. In other words, the deformable mirror 13 returns its mirror surface to a planar shape. This operation of the deformable mirror 13 may be carried out under control of the control device 17, for example. In this state, the laser emission device 12 emits the emitted light 121. The deformable mirror 13 reflects the emitted light 121 as the corrected light 131 without correcting the wavefront thereof. The partial reflection mirror 14 reflects a part of the corrected light 131 as the reflected light 141 and transmits another part of the corrected light 131 as the transmitted light 142. The wavefront sensor 16 detects a wavefront distortion of the reflected light 141, generates a wavefront distortion signal 161 that indicates the detected wavefront distortion and transmits it to the control device 17. The control device 17 receives the wavefront distortion signal 161 and generates a control signal 171 to correct the wavefront distortion indicated by this wavefront distortion signal 161 by the deformable mirror 13. Herein, the control device 17 may carry out analysis of the wavefront distortion signal 161 and calculation of the control signal 171 by use of so called Zernike polynomial. The control device 17 transmits the generated control signal 171 to the deformable mirror 13.

The deformable mirror 13 receives the control signal 171 and deforms the mirror surface thereof based on the control signal 171. As a result, the deformable mirror 13 reflects the emitted light 121 that irradiates on the mirror surface thereof and therefore the wavefront of the corrected light 131 that is reflected is corrected. By repeating such feedback control, the wavefront of the corrected light 131 is corrected more accurately and as a result the irradiation light 151 is more accurately focused as well.

However, the technology of correcting a wavefront of a laser beam by use of a deformable mirror 13 has limitations as follows. That is, a deformable mirror 13 is provided with a mechanism to deform a mirror surface on back side of the mirror surface. For this reason, it is difficult to add a cooling mechanism on the back side of the mirror surface. Therefore, it is difficult to reflect a high power laser beam by a deformable mirror 13. It should be noted that a technology of once diffusing, reflecting by a deformable mirror 13 and then focusing a high power laser beam to suppress generation of heat by a unit area of the deformable mirror 13 is also known. However, in this case, a whole optical system will become larger.

Thus, in the present embodiment, correction of wavefront will be carried out by use of a transmission type adaptive optical element 3 as described below instead of a deformable mirror 13. As a result, a wavefront of a laser beam with a higher power will be able to be corrected without enlarging the optical system.

First Embodiment

Figure 2A:
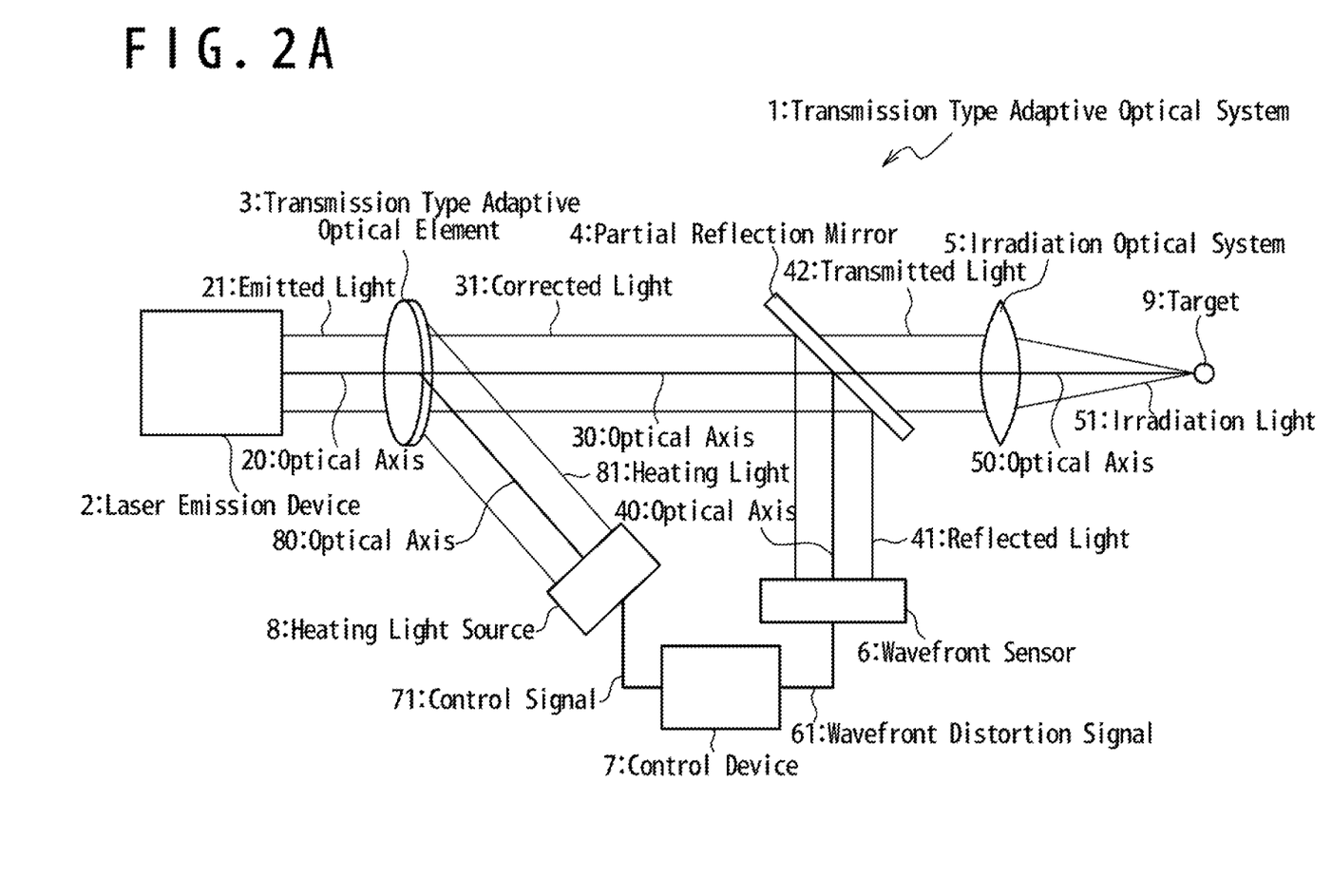
FIG. 2A is a diagram showing a configuration example of a transmission type adaptive optical system according to an embodiment.

A transmission type adaptive optical system 1 according to the present embodiment will be described with reference to FIG. 2A. FIG. 2A is a diagram showing a configuration example of the transmission type adaptive optical system 1 according to an embodiment.

Components of the transmission type adaptive optical system 1 in FIG. 2A will be described. The transmission type adaptive optical system 1 in FIG. 2A is provided with a laser emission device 2, a transmission type adaptive optical element 3, a partial reflection mirror 4, an irradiation optical system 5, a wave front sensor 6, a control device 7 and a heating light source 8.

The laser emission device 2 emits a laser beam as emitted light 21. This laser beam is preferably a high power laser beam such as Yb:YAG (Ytterbium-doped yttrium aluminum garnet) laser beam, Nd:YAG (Neodymium-doped yttrium aluminum garnet) laser beam or the like, for example.

The transmission type adaptive optical element 3 may be a plate material provided with an appropriate absorption spectrum by doping a glass, a YAG (yttrium aluminum garnet) crystal or the like with ions such as transition metals and rare earths, for example. It is preferable that the transmission type adaptive optical element 3 generated in such a way transmits a laser beam emitted by the laser emission device 2 and that refraction index distribution thereof changes by absorption of heating light 81 irradiated from outside on the other hand. It should be noted that absorption rate of the transmission type adaptive optical element 3 is preferably different based on wavelength of incident light and that the transmission type adaptive optical element 3 preferably transmits light other than the heating light, such as excitation light, guide light or the like, for example. In other words, the absorption rate of the transmission type adaptive optical element 3 related to absorption of a laser beam emitted by the laser emission device 2, the excitation light, the guide light or the like is preferably smaller than an absorption rate of the transmission type adaptive optical element 3 related to absorption of the heating light.

The partial reflection mirror 4 reflects a part of incident light as corrected light 31 and transmits another part thereof. The irradiation optical system 5 focuses the incident light as transmitted light 42 to a predetermined position. The wavefront sensor 6 detects wavefront distortion of the incident light as reflected light 41. The control device 7 controls the heating light source 8 based on a detection result of the wavefront sensor and carries out a feedback control of the transmission type adaptive optical system 1. The heating light source 8 emits heating light 81 under control of the control device 7 to adjust refraction index distribution of the transmission type adaptive optical element 3.

Figure 2B:
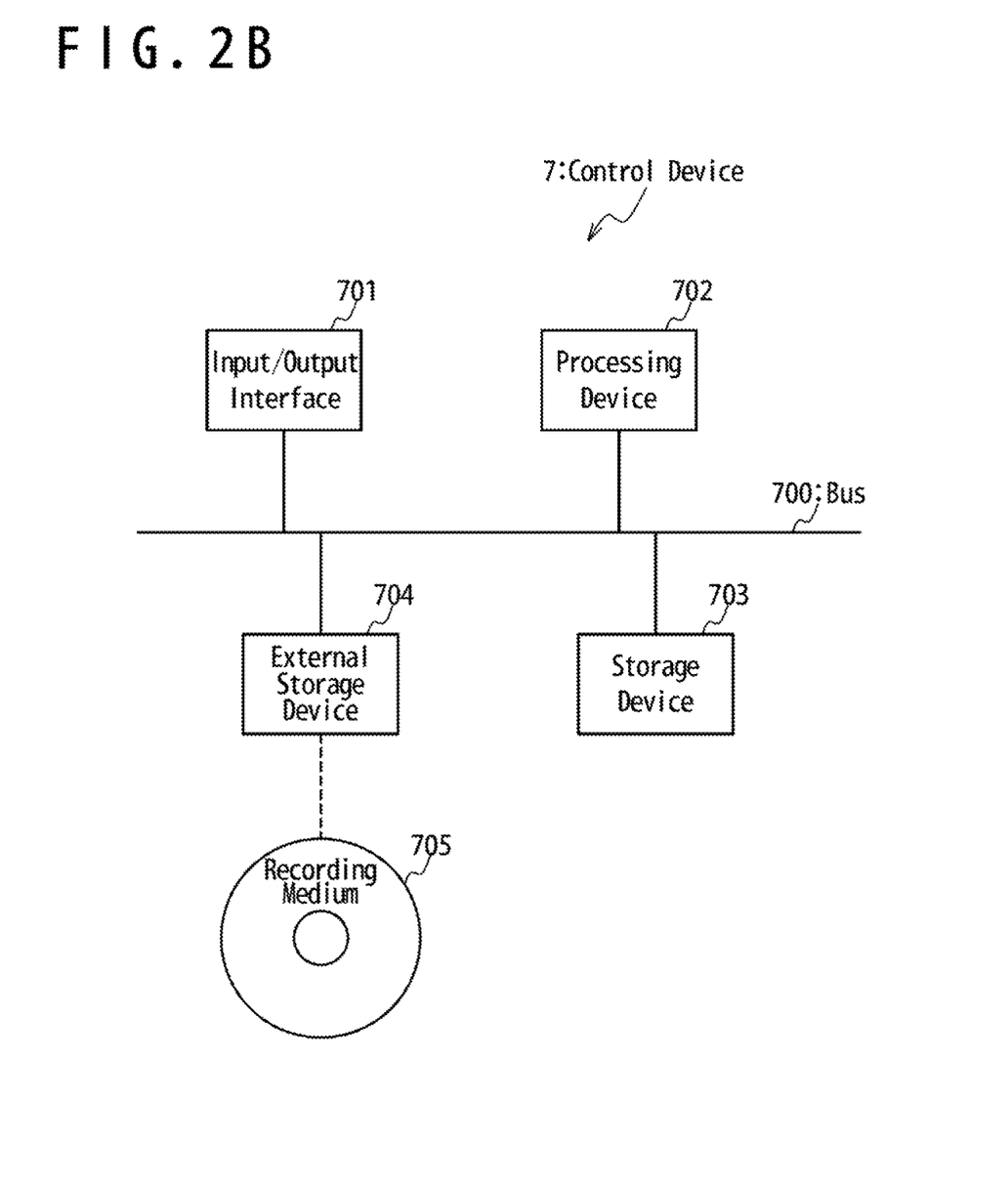
FIG. 2B is a diagram showing a configuration example of a control device according to an embodiment.

A configuration example of the control device 7 according to the present embodiment will be described with reference to FIG. 2B. FIG. 2B is a block circuit diagram showing a configuration example of the control device 7 according to an embodiment.

Components of the control device 7 in FIG. 2B will be described. The control device 7 in FIG. 2B is provided with a bus 700, an input/output interface 701, a processing device 702, a storage device 703, an external storage device 704 and a recording medium 705.

It should be noted that the control device 7 may be integrated with the wavefront sensor 6 or integrated with the heating light source 8, partially or integrally. Herein, the description will be carried on given that the wavefront sensor 6, the control device 7 and the heating light source 8 are separately configured and electrically connected.

Connection relationship and arrangement relationship of components of the transmission type adaptive optical system 1 in FIG. 2A will be described. The laser beam emitted by the laser emission device 2 will be referred to as emitted light 21 for convenience. The emitted light 21 travels along its optical axis 20 and transmits through the transmission type adaptive optical element 3 arranged in downstream side of the laser emission device 2. The emitted light 21 after being transmitted through the transmission type adaptive optical element 3 will be referred to as corrected light 31 for convenience.

A part of the corrected light 31 travels along its optical axis 30 and is reflected by the partial reflection mirror 4 arranged in downstream side of the transmission type adaptive optical element 3. In other words, the transmission type adaptive optical element 3 is arranged on an optical path between the partial reflection mirror 4 and the laser emission device 2, so as to transmit the emitted light 21. It should be noted that in the configuration example in FIG. 2A the optical axis 20 and the optical axis 30 are parallel. A part of the corrected light 31 that is reflected by the partial reflection mirror 4 will be referred to as reflected light 41 for convenience. The reflected light 41 reaches the wavefront sensor 6. It should be noted that an optical axis 40 of the reflected light 41 is not parallel to the optical axis 20 and the optical axis 30.

Another part of the corrected light 31 transmits through the partial reflection mirror 4. A part of the corrected light 31 that is transmitted through the partial reflection mirror 4 will be referred to as transmitted light 42 for convenience. The transmitted light 42 travels along the optical axis 30 and transmits through the irradiation optical system 5 arranged in downstream side of the partial reflection mirror 4. The transmitted light 42 after being transmitted through the irradiation optical system 5 will be referred to as irradiation light 51 for convenience.

It should be noted that in the configuration example in FIG. 2A an optical axis 50 of the irradiation light 51 is parallel to and identical to the optical axis 20 and the optical axis 30 and the irradiation light 51 focuses at a position of a desired target 9. However, this is merely an example and configurations of the transmission type adaptive optical system 1 according to the present embodiment are not limited thereby. Specifically, a position of the target 9 is not on the optical axis 20 and the optical axis 30 necessarily. On the contrary, it is preferable that the irradiation optical system 5 can appropriately adjust a direction of the optical axis 50 of the irradiation light 51 and the focusing position of the irradiation light 51 based on the position of the target 9 by use of drive system and control system that are not shown.

The wavefront sensor 6 is electrically connected to the control device 7. More specifically, the wavefront distortion signal 61 generated and outputted by the wavefront sensor 6 is transmitted to the control device 7 and is received by the control device 7. The control device 7 is electrically connected to the heating light source 8. More specifically, control signal 71 generated and outputted by the control device 7 is transmitted to the heating light source 8 and is received by the heating light source 8.

Connection relationship of components of the control device 7 in FIG. 2B will be described. The input/output interface 701, the processing device 702, the storage device 703 and the external storage device 704 are electrically connected to the bus 700 and can communicate to each other via the bus 700. The input/output interface 701 is electrically connected to the wavefront sensor 6 and the heating light source 8 in FIG. 2A. The external storage device 704 is able to read programs, data and the like from a detachable recording medium 705 and to write thereto on the contrary as well.

The laser beam emitted by the heating light source 8 will be referred to as heating light 81 for convenience. The heating light 81 is emitted along its optical axis 80 to the transmission type adaptive optical element 3. It should be noted that the optical axis 80 is not parallel to the optical axis 20 and the optical axis 30.

Operations of components of the transmission type adaptive optical system 1 in FIG. 2A will be described. At first, the heating light source 8 returns to an initial state. In other words, the heating light source 8 returns light intensity distribution of the heating light 81 to be emitted in a uniform state. This operation of the heating light source 8 may be carried out under control of the control device 7 for example. The transmission type adaptive optical element 3 returns to an initial state in this state, that is, by being irradiated with the heating light 81 having a uniform light intensity distribution. In other words, refraction index distribution of the transmission type adaptive optical element 3 returns to a uniform state.

It should be noted that the refraction index distribution of the transmission type adaptive optical element 3 in the initial state may not be uniform necessarily. Such a case will be described below. Herein, description will be carried on given that the refractive index distribution of the transmission type adaptive optical element 3 in the initial state is uniform.

In a state where the heating light source 8 and the transmission type adaptive optical element 3 are returned to the initial states, the laser emission device 2 emits the emitted light 21. The transmission type adaptive optical element 3 in the initial state transmits the emitted light 21 as corrected light 31 without correcting the wavefront thereof. The partial reflection mirror 4 reflects a part of the corrected light 31 as reflected light 41 and transmits another part of the corrected light 31 as transmitted light 42. The wavefront sensor 6 detects wavefront distortion of the reflected light 41, generates wavefront distortion signal 61 indicating the detected wavefront distortion and transmits it to the control device 7. The control device 7 receives the wavefront distortion signal 61 and generates control signal 71 to correct the wavefront distortion indicated by this wavefront distortion signal 61 by the heating light source 8 and the transmission type adaptive optical element 3.

Operations of components of the control device 7 in FIG. 2B will be described. The bus 700 mediates communications between the input/output interface 701, the processing device 702, the storage device 703 and the external storage device 704. The input/output interface 701 mediates communications between the wavefront sensor 6 and the heating light source 8, that are connected outside the control device 7, and the processing device 702, the storage device 703 and the external storage device 704, that are connected inside the control device 7. The processing device 702 reads programs and data stored in the storage device 703, executes the programs and writes results thereof to the storage device 703. The storage device 703 stores programs, data and the like. The external storage device 704 reads programs, data and the like from the recording medium 705 and write them to the storage device 703, or, on the contrary, reads programs, data and the like from the storage device 703 and writes them to the recording medium 705.

Figure 3A:
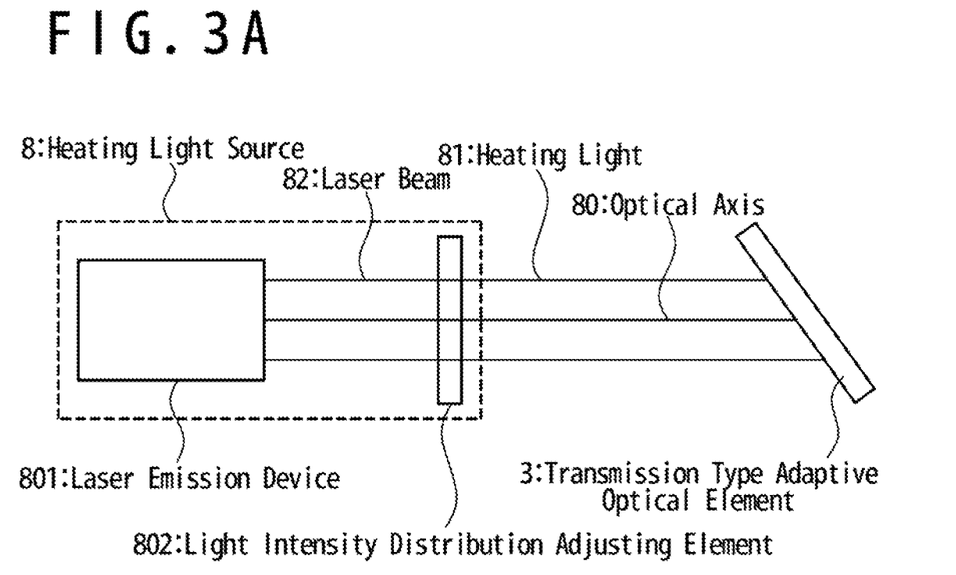
FIG. 3A is a diagram showing a configuration example of a heating light source according to an embodiment.

It will be described that wavefront distortion of the emitted light 21 can be corrected by use of the heating light source 8 and the transmission type adaptive optical element 3, with reference to FIGS. 3A to 3D. FIG. 3A is a diagram showing a configuration example of the heating light source 8 according to an embodiment.

The heating light source 8 in FIG. 3A is provided with a laser emission device 801 and a light intensity distribution adjusting element 802. The light intensity distribution adjusting element 802 is arranged in downstream side of the laser beam 82 emitted by the laser emission device 801. In addition, the light intensity distribution adjusting element 802 is electrically connected to the control device 7.

The laser emission device 801 in FIG. 3A emits the laser beam 82. This laser beam 82 transmits through the light intensity distribution adjusting element 802. The laser beam 82 after being transmitted through the light intensity distribution adjusting element 802 is the heating light 81 shown in FIG. 2A. The heating light 81 has wavelength absorbed by the transmission type adaptive optical element 3, as described above. The transmission type adaptive optical element 3 is heated by absorbing the heating light 81. When an absorption body included in the transmission type adaptive optical element 3 is heated, refraction index of the transmission type adaptive optical element 3 is modified. More specifically, when the transmission type adaptive optical element 3 is heated by the heating light 81 having a predetermined light intensity distribution, temperature distribution of the transmission type adaptive optical element 3 will have a distribution similar to the light intensity distribution. As a result, refraction index of the transmission type adaptive optical element 3 is modified to have a distribution similar to the light intensity distribution. In other words, the control device 7 can control refraction index distribution of the transmission type adaptive optical element 3 by appropriately adjusting light intensity distribution of the heating light 81.

Figure 3B:
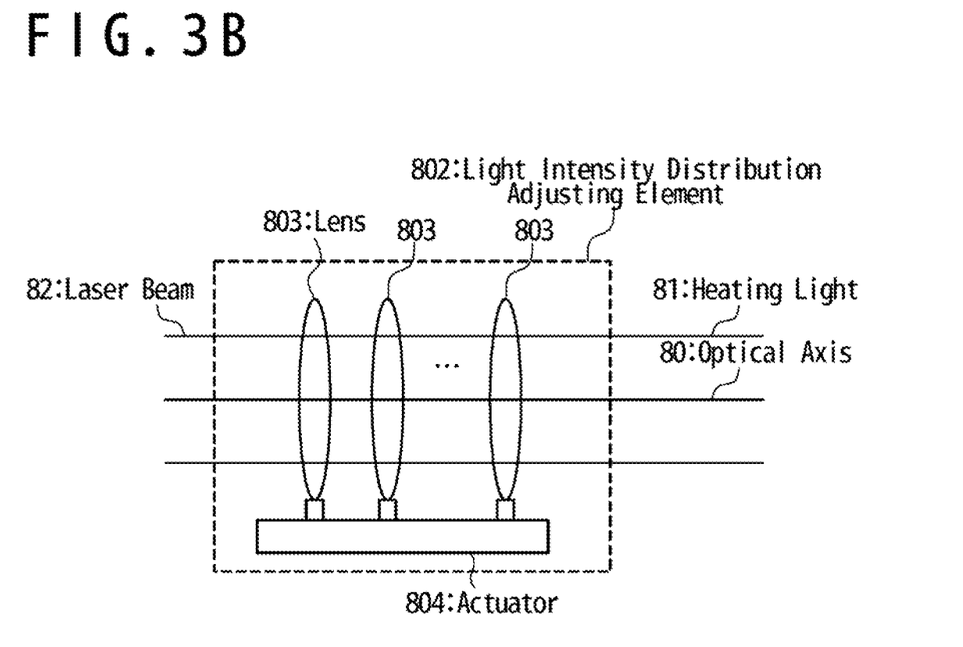
FIG. 3B is a diagram showing a configuration example of a light intensity distribution adjusting element according to an embodiment.

FIG. 3B is a diagram showing a configuration example of a light intensity distribution adjusting element 802 according to an embodiment. The light intensity distribution adjusting element 802 in FIG. 3B is provided with a plurality of lenses 803 and an actuator 804 that adjusts position of each lens 803. The light intensity distribution of the laser beam 82 emitted by the laser emission device 801 is adjusted by transmission of the laser beam 82 through the plurality of lenses 803. The actuator 804 moves position of each lens 803 independently, based on control signal 71 generated by the control device 7. For example, the actuator 804 moves lenses 803 in a direction parallel to optical axis 80 of the laser beam 82. In addition, the actuator 804 may move lenses 803 in a direction perpendicular to the optical axis 80 of the laser beam 82. In addition, the actuator 804 may incline a lens 803 so that optical axis direction of the lens 803 is not parallel to a direction of the optical axis 80 of the laser beam 82. In other words, the lens 803 is inclined so that the optical axis direction of the lens 803 intersects or is in a twist position with the optical axis 80 of the laser beam 82. The actuator 804 can adjust light intensity distribution of the heating light 81 transmitted through each lens 803 by adjusting position of each lens 803. It should be noted that the lens 803 provided to the light intensity distribution adjusting element 802 may be single.

Figure 3C:
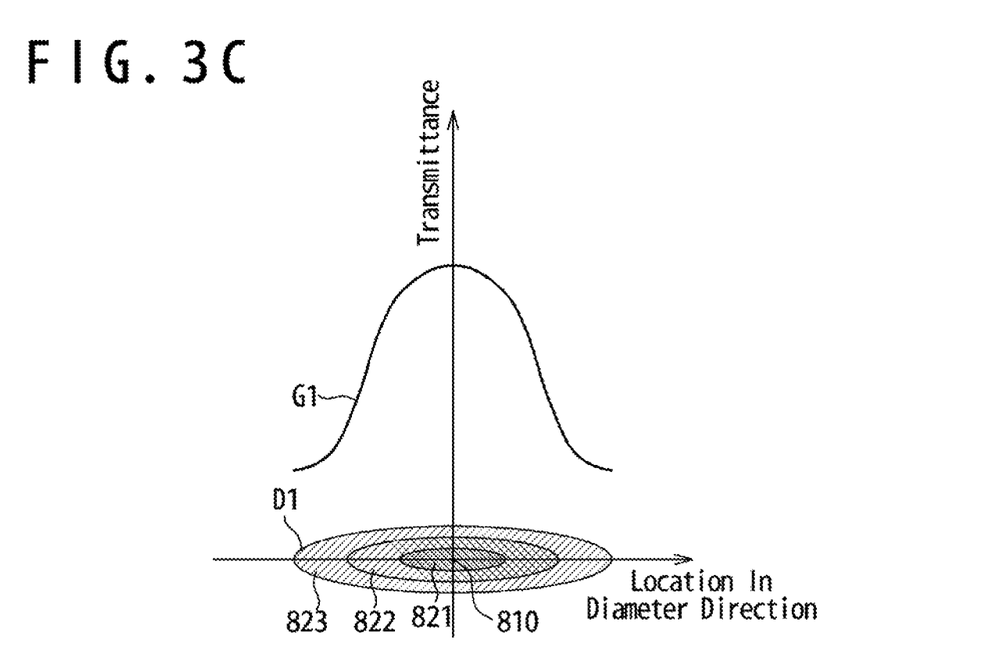
FIG. 3C is a diagram showing an operation example of the heating light source according to an embodiment.

FIG. 3C is a diagram showing an operation example of a heating light source 8 according to an embodiment. An top part in FIG. 3C is a graph G1 showing an example of a distribution of transmittance of the light intensity distribution adjusting element 802 in diameter direction. In addition, a bottom part in FIG. 3C is a colored map D1 showing in perspective an example of a distribution of transmittance on a surface of the light intensity distribution adjusting element 802. In the graph G1, a vertical axis (an arrow that connects the graph G1 and the colored map D1) shows transmittance. The center 810 shows a position where the light intensity distribution adjusting element 802 intersects the optical axis 80. A length from the center 810 in a horizontal axis shows a distance from a position where the light intensity distribution adjusting element 802 intersects the optical axis 80.

In the colored map D1, the center 810 shows a position where the light intensity distribution adjusting element 802 intersects the optical axis 80, similarly to the graph G1. In addition, a first area 821, a second area 822 and a third area 823 in the colored map C1 show areas belonging to predetermined ranges of transmittance. The first area 821 shows an area with high transmittance. The third area 823 shows an area with low transmittance. The second area 822 shows an area with transmittance lower than the first area 821 and higher than the third area 823.

In the example of FIG. 3C, the graph G1 and the colored map D1 show that the light intensity distribution adjusting element 802 has a higher transmittance in an area closer to center part where the optical axis 80 passes and lower transmittance in an area closer to end part away from the optical axis 80 in the contrary. It should be noted that FIG. 3C is merely an example and configurations of the transmission type adaptive optical system 1 according to the present embodiment are note limited thereby.

In case of FIG. 3C, the heating light 81 that is the laser beam 82 transmitted through the light intensity distribution adjusting element 802 reaches the transmission type adaptive optical element 3 with a higher light intensity in area closer to center part where the optical axis 80 passes. In addition, on the other hand, the heating light 81 reaches the transmission type adaptive optical element 3 with a lower light intensity in area closer to end part away from the optical axis 80. As a result, center part of the transmission type adaptive optical element 3 is irradiated with center part of the heating light 81 that has higher light intensity and the temperature thereof becomes higher. In addition, end part of the transmission type adaptive optical element 3 is irradiated with end part of the heating light 81 that has lower light intensity and the temperature thereof becomes lower compared to the center part of the transmission type adaptive optical element 3.

Figure 3D:
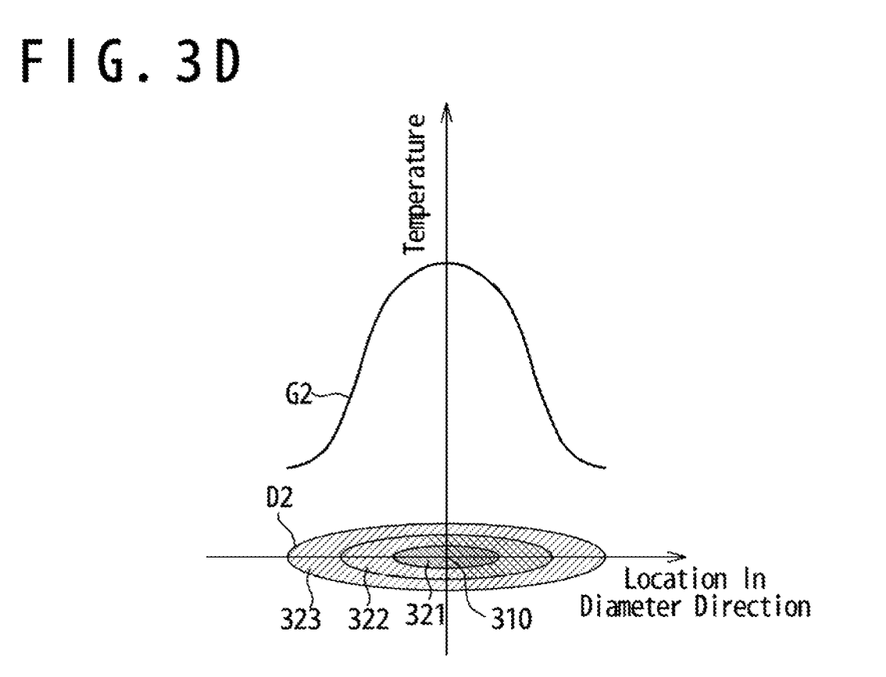
FIG. 3D is a diagram showing an operation example of the transmission type adaptive optical element according to an embodiment.

FIG. 3D is a diagram showing an operation example of a transmission type adaptive optical element 3 according to an embodiment. A top part of FIG. 3D is a graph G2 showing an example of temperature distribution in diameter direction of a transmission type adaptive optical element 3. In addition, a bottom part of FIG. 3D is a colored map D2 showing in perspective an example of temperature distribution of a surface of the transmission type adaptive optical element 3. In the graph G2, vertical axis (an arrow that connects the graph G2 and the colored map D2) shows temperature. A center 310 shows a position where the transmission type adaptive optical element 3 intersects the optical axis 80. A length on a horizontal axis from the center 310 shows a distance of the position where the transmission type adaptive optical element 3 intersects the optical axis 80. In the colored map D2, the center 310 shows the position where the transmission type adaptive optical element 3 intersects the optical axis 80, similarly to the graph G2. In addition, a first area 321, a second area 322 and a third area 323 of the colored map D2 shows areas belonging to predetermined ranges of temperature. The first area 321 shows an area with high temperature. The third area 323 shows an area with low temperature. The second area 322 shows an area with temperature lower than the first area 321 and higher than the third area 323.

In the example of FIG. 3D, the graph G2 and the colored map D2 show that the temperature of the transmission type adaptive optical element 3 is higher in area closer to center part where the optical axis 30 passes and lower in area closer to end part away from the optical axis 30 in contrary. This temperature distribution respectively corresponds to the transmittance distribution shown in FIG. 3C and the light intensity distribution of the heating light 81 emitted to and absorbed by the transmission type adaptive optical element 3 as a result. It should be noted that FIG. 3D is, similarly to the case of FIG. 3C, merely an example and that configurations of the transmission type adaptive optical system 1 according to the present embodiment are not limited thereby.

In case of FIG. 3D, refraction index related to the emitted light 21 emitted from the laser emission device 2 becomes relatively higher in the center part of the transmission type adaptive optical element 3 where temperature became relatively higher. In addition, on the other hand, refraction index related to the emitted light 21 becomes relatively lower in an end part of the transmission type adaptive optical element 3 where temperature became relatively lower. Wavefront distortion of the emitted light 21 is corrected by such a refractive index distribution. In other words, temperature distribution of the transmission type adaptive optical element 3 is controlled so that the transmission type adaptive optical element 3 has a refraction index by which wavefront distortion of the emitted light 21 is corrected.

A configuration example in which the transmission type adaptive optical element 3 has a higher refraction index in a part with higher temperature and a lower refraction index in a part with lower temperature in contrary has been described in the above example. The relationship between temperature and refraction index is merely an example and a transmission type adaptive optical element 3 having an opposite relationship, that is, having a lower refraction index in part with higher temperature and a higher refraction index in part with lower temperature may be used.

In the configuration example in FIG. 2A, the optical axis 80 of the heating light 81 intersects the optical axis 20 of the emitted light 21 and the optical axis 30 of the corrected light 31 at an angle of about 45 degrees. This angle is merely an example and configurations of the transmission type adaptive optical system 1 according to the present embodiment are not limited thereby. For example, an angle between the optical axis 80 and the optical axis 30 may be perpendicular. However, in such a case, a practical restriction may arise in a shape of temperature distribution that can be generated in the transmission type adaptive optical element 3. Therefore, the angle between the optical axis 80 and the optical axis 30 is preferably appropriately selected based on temperature distribution that is desired to be generated in the transmission type adaptive optical element 3.

Variation Example

A variation example of the present embodiment will be described. There is a case where temperature distribution desired to be generated in the transmission type adaptive optical element 3 is known to some extent before the laser emission device 2 emits the laser beam as the emitted light 21. This is, for example, a case where there is some trouble in the laser emission device 2 itself and a distortion occurs to wavefront of the emitted light 21 due to this trouble. Such kind of wavefront distortion will be referred to as initial distortion for convenience.

If an initial distortion is known, the transmission type adaptive optical element 3 may be able to correct this initial distortion at an initial state thereof. Moreover, the transmission type adaptive optical system 1 may correct, when wavefront distortion is modified based on its own operation time, a fluctuation at that time by feedback control. A correctable range of wavefront distortion by the transmission type adaptive optical element 3 according to the present embodiment can be enlarged efficiently by carrying out such configuration.

As a configuration able to correct initial distortion, for example, it can be considered to make non-uniform a physical shape of the transmission type adaptive optical element 3 in accordance with the initial distortion. Specifically, it can be considered to make non-uniform a thickness of the transmission type adaptive optical element 3 in accordance with the initial distortion. As another example, it can be considered to make non-uniform a dope concentration distribution of absorber included in the transmission type adaptive optical element 3 in accordance with the initial distortion.

The transmission type adaptive optical system 1 according to an embodiment has been described as above. Since the deformable mirror 13 reflects a laser beam, the laser beam needs to be emitted obliquely to a reflection surface of the deformable mirror 13. For this reason, the deformable mirror 13 becomes larger to be applicable to a high power laser beam. On the other hand, since the transmission type adaptive optical element 3 transmits a laser beam, the transmission type adaptive optical element 3 may be irradiated with a laser beam perpendicular to an incident surface thereof. For this reason, the transmission type adaptive optical system 1 according to the present embodiment can be applied to a high power laser beam and correct wavefront distortion thereof without being enlarged compared to the adaptive optical system 11 using a deformable mirror 13 in FIG. 1.

Second Embodiment

Figure 4:
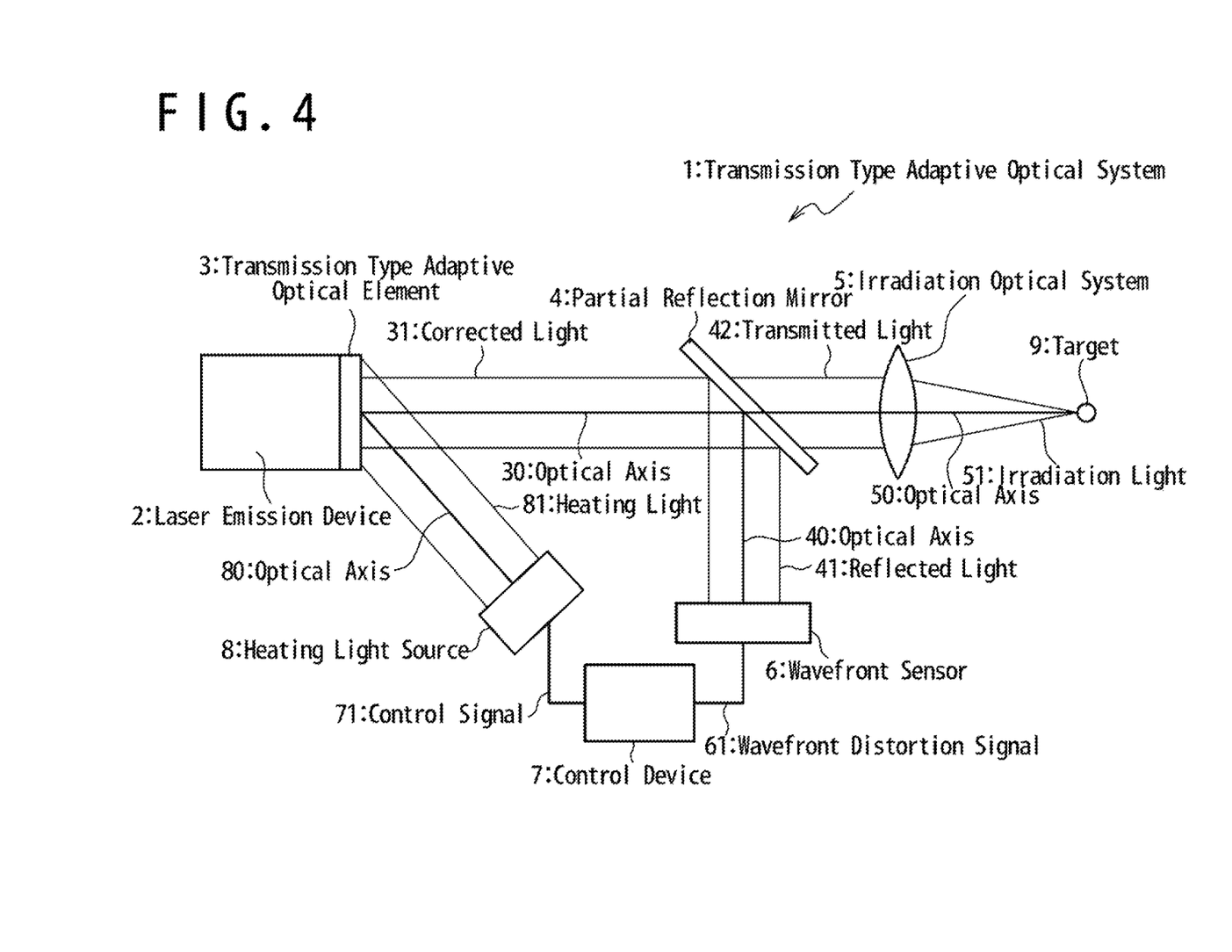
FIG. 4 is a diagram showing a configuration example of the transmission type adaptive optical system according to an embodiment.

A transmission type adaptive optical system 1 according to the present embodiment will be described with reference to FIG. 4. FIG. 4 is a diagram showing a configuration example of a transmission type adaptive optical system 1 according to an embodiment.

The transmission type adaptive optical system 1 in FIG. 4 is equivalent to the transmission type adaptive optical system 1 in FIG. 2A added with following modifications. That is, the laser emission device 2 and the transmission type adaptive optical element 3 are integrated in transmission type adaptive optical system 1 in FIG. 4. By such a configuration, accuracy of position relationship between the laser emission device 2 and the transmission type adaptive optical element 3 can be improved in the transmission type adaptive optical system 1 in FIG. 4 compared to the case in FIG. 2A.

In the configuration example in FIG. 4, the transmission type adaptive optical element 3 is fixed in an immediate downstream side of the laser emission device 2. Therefore, the transmission type adaptive optical system 1 as a whole can be downsized of a space between the laser emission device 2 and the transmission type adaptive optical element 3 that is omitted. Furthermore, if optical axes of the laser emission device 2 and the transmission type adaptive optical element 3 are identical, a driving system to adjust position relationship between them can be omitted and the transmission type adaptive optical system 1 can be further downsized.

Other configuration of the transmission type adaptive optical system 1 in FIG. 4 is similar to the case in FIG. 2A and therefore further detailed description thereof will be omitted.

Although the invention made by the inventor(s) has been described above in detail based on embodiments, the present invention is not limited to the above described embodiments and it is needless to assert that various modifications can be carried out without departing from the gist of the invention. In addition, each of features described in above embodiments can be freely combined within a technically consistent range.

The present application claims priority based on Japanese patent application 2018-32277 filed on Feb. 26, 2018 and all disclosure thereof is incorporated herein.

The invention claimed is:

1. A transmission type adaptive optical system comprising:
    a laser emission device configured to emit a laser beam;
    a partial reflection mirror configured to reflect a part of the laser beam as reflected light and transmit another part thereof as transmission light;
    a wavefront sensor configured to detect wavefront distortion of the reflected light and to generate and output a wavefront distortion signal indicating the wavefront distortion;
    a control device configured to generate and output a control signal to correct the wavefront distortion based on the wavefront distortion signal;
    a heating light source configured to generate and emit heating light that adjusts temperature distribution in an irradiated optical element based on the control signal;
    a transmission type adaptive optical element arranged on a light path between the laser emission device and the partial reflection mirror to transmit the laser beam and configured to correct a wavefront of the laser beam by a refraction index distribution adjusted by a temperature distribution occurred by irradiation of the heating light; and
    an irradiation optical system configured to irradiate a desired target with transmission light that is transmitted through the partial reflection mirror,
    wherein the transmission type adaptive optical element comprises a plate material having a predetermined absorption spectrum,
    wherein the plate material comprises at least one of a glass or a YAG crystal doped with at least one ion of transition metals and rare earths so as to correspond to the absorption spectrum,
    wherein the heating light is another laser beam having a wavelength different from the laser beam, and
    wherein, at least in an initial state in which the transmission type adaptive optical element is irradiated with the heating light in a state with a uniform light intensity distribution, a first absorption rate of absorbing the laser beam by the transmission type adaptive optical element is smaller than a second absorption rate of absorbing the other laser beam by the transmission type adaptive optical element.

2. The transmission type adaptive optical system according to claim 1,
    wherein the heating light source comprises:
        another laser emission device configured to emit the other laser beam; and
        a light intensity distribution adjusting element configured to adjust a light intensity distribution of the other laser beam based on the control signal so as to generate the refraction index distribution in the transmission type adaptive optical element as desired.

3. The transmission type adaptive optical system according to claim 1,
    wherein the transmission type adaptive optical element has a non-uniform refraction index distribution in the initial state.

4. The transmission type adaptive optical system according to claim 3,
  wherein the transmission type adaptive optical element comprises an absorption body having a non-uniform dope concentration distribution.

5. The transmission type adaptive optical system according to claim 3,
  wherein the transmission type adaptive optical element has a non-uniform thickness.

6. The transmission type adaptive optical system according to claim 1,
  wherein the transmission type adaptive optical element is fixed to the laser emission device.

\* \* \* \* \*